United States Patent
Kneckt et al.

(10) Patent No.: US 10,904,829 B2
(45) Date of Patent: Jan. 26, 2021

(54) DEVICE-AVAILABILITY-BASED WAKE-UP TIME SCHEDULE

(71) Applicant: Apple Inc., Cupertino, CA (US)

(72) Inventors: Jarkko L. Kneckt, Los Gatos, CA (US); Chiu Ngok E. Wong, San Jose, CA (US); Yong Liu, Campbell, CA (US); Christiaan A. Hartman, San Jose, CA (US); Guoqing Li, Cupertino, CA (US); Daniel R. Borges, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/053,386

(22) Filed: Aug. 2, 2018

(65) Prior Publication Data

US 2019/0053155 A1 Feb. 14, 2019

Related U.S. Application Data

(60) Provisional application No. 62/543,034, filed on Aug. 9, 2017.

(51) Int. Cl.
*H04W 52/02* (2009.01)
*H04W 76/28* (2018.01)
*H04W 72/12* (2009.01)

(52) U.S. Cl.
CPC ... *H04W 52/0216* (2013.01); *H04W 52/0229* (2013.01); *H04W 72/1205* (2013.01); *H04W 72/1289* (2013.01); *H04W 76/28* (2018.02); *Y02D 30/70* (2020.08)

(58) Field of Classification Search
CPC .............. H04W 52/0216; H04W 76/28; H04W 52/0229; H04W 72/1289; H04W 72/1205; Y02D 30/70
See application file for complete search history.

(56) References Cited

U.S. PATENT DOCUMENTS

| | | |
|---|---|---|
| 2014/0133376 A1 | 5/2014 | Ghosh |
| 2016/0219510 A1* | 7/2016 | Asterjadhi ........ H04W 52/0274 |
| 2017/0055290 A1* | 2/2017 | Lv .................... H04W 74/0816 |
| 2017/0064633 A1* | 3/2017 | Jia .................... H04W 52/0258 |
| 2017/0265130 A1 | 9/2017 | Kakani |
| 2017/0280388 A1 | 9/2017 | Asterjadhi |

(Continued)

*Primary Examiner* — Omar J Ghowrwal
(74) *Attorney, Agent, or Firm* — Kowert, Hood, Munyon, Rankin & Goetzel, P.C.

(57) ABSTRACT

An interface circuit in an electronic device (such as an access point) may provide a targeted wake-up time (TWT) service period (SP) schedule to a recipient electronic device. During operation the interface circuit may receive a TWT setup request associated with the recipient electronic device, where the TWT setup request includes non-availability information specifying one or more times when the recipient electronic device will be unavailable. For example, the non-availability information may include one or more times when the recipient electronic device has limited ability to transmit and/or receive. The interface circuit may provide a TWT setup response for the recipient electronic device, where the TWT setup response includes information specifying the TWT SP schedule for the recipient electronic device that includes at least one of: a TWT SP start time, a TWT SP duration, or an interval between TWT SPs.

20 Claims, 11 Drawing Sheets

(56) References Cited

U.S. PATENT DOCUMENTS

2017/0339680 A1\* 11/2017 Jia .................... H04W 28/02
2018/0132178 A1   5/2018 Park
2018/0192372 A1\* 7/2018 Park ................ H04W 52/0229
2019/0021055 A1\* 1/2019 Guo .................... H04L 43/10
2019/0253968 A1\* 8/2019 Xiao ................... H04L 47/28
2019/0253972 A1\* 8/2019 Park ................... H04W 84/12

\* cited by examiner

DEVICE-AVAILABILITY-BASED WAKE-UP TIME SCHEDULE

CROSS-REFERENCE TO RELATED APPLICATION

This application claims the benefit of U.S. Provisional Application No. 62/543,034, entitled "TWT SP Schedule Based on Electronic Device Availability," by Jarkko L. Kneckt, et al., filed Aug. 9, 2017, the contents of which are hereby incorporated by reference.

FIELD

The described embodiments relate, generally, to wireless communications among electronic devices, and techniques for modifying a targeted wake-up time (TWT) service period (SP) schedule based on times when a recipient electronic device will be unavailable or has limited ability to transmit or receive.

BACKGROUND

Many electronic devices communicate with each other using wireless local area networks (WLANs), such as those based on a communication protocol that is compatible with an IEEE 802.11 standard (which is sometimes referred to as 'WI-FI'). However, a radio in an electronic device that communicates using wireless communication in a WLAN may consume a significant amount of power.

In order to address this challenge, a new radio technology called Low Power Wake Up Radio (wake-up radio) is being considered (in the discussion that follows a LP-WUR is referred to as a 'wake-up radio'). The wake-up radio may be a companion to the main WI-FI radio in the electronic device. Notably, by using the wake-up radio, the electronic device may turn off its main radio and may wake up the main radio in response to the wake-up radio receiving a wake-up radio packet from an access point. For example, the access point may send the wake-up radio packet when there is a down-link packet for the electronic device.

SUMMARY

A first group of embodiments relates to an electronic device that determines a targeted wake-up time (TWT) service period (SP) schedule for a recipient electronic device. This electronic device may include a node that can be communicatively coupled to an antenna, and an interface circuit communicatively coupled to the node and that communicates with a recipient electronic device. During operation, the interface circuit receives, from the node, a TWT setup request associated with the recipient electronic device, where the TWT setup request includes non-availability information specifying one or more times when the recipient electronic device will be unavailable. Then, the interface circuit provides, to the node, a TWT setup response intended for the recipient electronic device, wherein the TWT setup response includes information specifying the TWT SP schedule for the recipient electronic device that includes at least one of: a TWT SP start time, a TWT SP duration, or an interval between TWT SPs.

Moreover, the electronic device may determine the TWT SP schedule for the recipient electronic device based, at least in part, on the non-availability information.

Furthermore, the TWT SP schedule may be modified based, at least in part, on the non-availability information. For example, the modification may include: a change to the TWT SP start time, a change to the TWT SP duration or both.

Additionally, when a time when the recipient electronic device will be unavailable occurs during a TWT SP in the TWT SP schedule, a longest time interval in the TWT SP when the recipient electronic device is available may be indicated in the TWT SP schedule.

In some embodiments, when a TWT SP has a TWT SP duration that is less than a minimum value, the TWT SP may be excluded from the TWT SP schedule.

Note that at least one of the TWT setup request or the TWT setup response may include an operating mode indication (OMI) parameter. Moreover, the OMI parameter may include information specifying at least one of: a change in a number of spatial streams used during the TWT SPs in the TWT SP schedule, or a change in a bandwidth used during communication with the recipient electronic device in the TWT SPs in the TWT SP schedule.

Furthermore, the TWT setup request may specify a TWT flow for power saving at the recipient electronic device.

Additionally, the integrated circuit may receive, from the node, a second TWT setup request associated with the recipient electronic device. The second TWT setup request may indicate a request for a TWT flow for power saving at the recipient electronic device.

In some embodiments, the TWT setup request does not suspend TWT SPs of the recipient electronic device.

Note that the TWT setup request may be compatible with an IEEE 802.11 communication protocol.

Moreover, the electronic device may include an access point.

Furthermore, the TWT SP schedule may specify broadcast TWT SPs and, based at least in part on the non-availability information, may transition the recipient electronic device from membership in a first TWT flow to a second TWT flow in which the broadcast TWT SPs are compatible with the non-availability information.

Additionally, the recipient electronic device being unavailable may include the recipient electronic device having limited ability to transmit, receive or both.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for determining a TWT SP schedule for a recipient electronic device. The method includes at least some of the aforementioned operations performed by the interface circuit in the electronic device.

A second group of embodiments relates to a recipient electronic device that receives a TWT setup response. This recipient electronic device may include a node that can be communicatively coupled to an antenna, and an interface circuit communicatively coupled to the node and that communicates with an electronic device. During operation, the interface circuit provides, to the node, a TWT setup request intended for the electronic device, where the TWT setup request includes non-availability information specifying times when the recipient electronic device will be unavailable. Then, the interface circuit receives, from the node, the TWT setup response associated with the electronic device, where the TWT setup response includes information specifying a TWT SP schedule for the recipient electronic device that includes one or more of: a TWT SP start time, a TWT SP duration, or an interval between TWT SPs.

Other embodiments provide an interface circuit in the recipient electronic device.

Other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the recipient electronic device.

Other embodiments provide a method for receiving a TWT setup response. The method includes at least some of the aforementioned operations performed by the interface circuit in the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Figure 1:
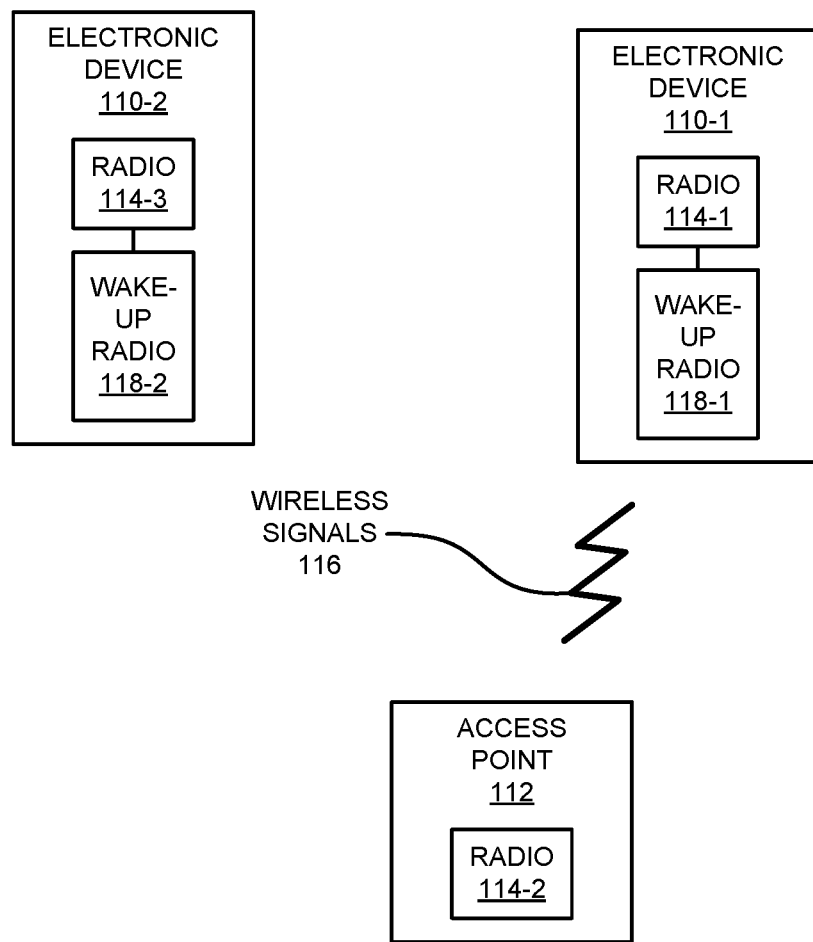
FIG. 1 is a block diagram illustrating an example of electronic devices communicating wirelessly.

Table 1 provides examples of TWT parameters.

Note that like reference numerals refer to corresponding parts throughout the drawings. Moreover, multiple instances of the same part are designated by a common prefix separated from an instance number by a dash.

DETAILED DESCRIPTION

A wake-up radio in an electronic device may turn on at predefined times (which are sometimes referred to as 'targeted wake-up time service periods' or TWT SPs) in a TWT SP schedule of the electronic device. However, the electronic device may not always be available during a TWT SP in the TWT SP schedule. For example, an electronic device may be: performing a scan of available channels, out of range of an access point, communicating with another electronic device, and/or operating another radio (such as a BLUETOOTH® radio) that cannot be operated concurrently with a WI-FI radio. Consequently, the electronic device may miss some or all of a TWT SP, which may increase the latency and/or the power consumption of the electronic device.

In order to address this problem, an interface circuit in an electronic device (such as an access point) may provide a TWT SP schedule to a recipient electronic device. Notably, during operation, the interface circuit may receive a TWT setup request associated with the recipient electronic device, where the TWT setup request includes non-availability information specifying one or more times when the recipient electronic device will be unavailable. For example, the non-availability information may include one or more times when the recipient electronic device has limited ability to transmit, receive or both. Then, the interface circuit may provide a TWT setup response for the recipient electronic device, where the TWT setup response includes information specifying the TWT SP schedule for the recipient electronic device that includes at least one of: a TWT SP start time, a TWT SP duration, or an interval between TWT SPs.

Furthermore, the recipient electronic device may include an interface circuit (or circuits) that includes a wake-up radio and a main radio. During operation, the recipient electronic device may transition the wake-up radio to a higher-power mode (or turn on the wake-up radio) based at least in part on the TWT SP schedule.

By adapting the TWT SP schedule of the recipient electronic device based at least in part on the non-availability information, this communication technique may facilitate improved performance between the electronic device and the recipient electronic device. For example, the communication technique may help ensure that the recipient electronic device is available to receive a packet or a frame from the electronic device at appropriate TWT SPs based at least in part on the TWT SP schedule. Consequently, the communication technique may facilitate improved communication performance (such as reduced latency) and/or reduced power consumption (by helping to ensure that the recipient electronic device does not transition the wake-up radio to a higher-power mode at incorrect times). Thus, the communication technique may improve the user experience when using the electronic device or the recipient electronic device, and therefore may increase customer satisfaction and retention.

Note that the communication technique may be used during wireless communication between electronic devices in accordance with a communication protocol, such as a communication protocol that is compatible with an IEEE 802.11 standard (which is sometimes referred to as WI-FI). In some embodiments, the communication technique is used with IEEE 802.11BA and/or IEEE 802.11ax, which are used as illustrative examples in the discussion that follows. However, this communication technique may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the BLUETOOTH Special Interest Group (in Kirkland, Wash.) and/or those developed by APPLE (in Cupertino, Calif.) that are referred to as an APPLE Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a WI-FI direct connection. In some embodiments, the client device can be any electronic device that is capable of communicating via a WLAN technology, e.g., in accordance with a WLAN communication protocol. Furthermore, in some embodiments, the WLAN technology can include a WI-FI (or more generically a WLAN) wireless communication subsystem or radio, and the WI-FI radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using WI-FI), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 11, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a WI-FI communication protocol in a WLAN. As illustrated further below with reference to FIGS. 2-4, radio 114-1 may receive wireless signals 116 that are transmitted by radio 114-2. Alternatively, radio 114-1 may transmit wireless signals 116 that are received by radio 114-2. However, as described further below with reference to FIG. 5, radio 114-1 consumes additional power in a higher-power mode. If radio 114-1 remains in the higher-power mode even when it is not transmitting or receiving packets, the power consumption of electronic device 110-1 may be needlessly increased. Consequently, electronic devices 110 may include wake-up radios 118 that listen for and/or receive wake-up frames (and/or other wake-up communications), e.g., from access point 112. When a particular electronic device (such as electronic device 110-1) receives a wake-up frame, wake-up radio 118-1 may selectively wake-up radio 114-1, e.g., by providing a wake-up signal that selectively transitions radio 114-1 from a low-power mode to the higher-power mode.

As discussed previously, in some embodiments, wake-up radios 118 may selectively transition from a lower-power mode to a higher-power mode at predefined times, such as based at least in part on one or more TWT SP schedules. This may further reduce the power consumption of electronic devices 110. However, if an electronic device (such as electronic device 110-1) will be unavailable during a TWT SP (such as when electronic device 110-1 is: performing a scan of available channels, out of range of access point 112, communicating with another electronic device, operating another radio, etc.), then this electronic device may miss or may not receive one or more packets or frames transmitted from access point 112 to electronic device 110-1 during the TWT SP.

In order to address this challenge, access point 112 may determine the TWT SP schedule for electronic device 110-1 based at least in part on availability of electronic device 110-1. Notably, as described further below with reference to FIG. 6, electronic device 110-1 may communicate information that specifies its availability (or, equivalently, non-availability) to access point 112. For example, radio 114-1 may transmit a TWT setup request in a packet or a frame to access point 112. This TWT setup request may include non-availability information specifying one or more times when electronic device 110-1 will be unavailable. After receiving the TWT setup request, access point 112 may determine the TWT SP schedule for electronic device 110-1 so that the TWT SPs, as much as possible, match the availability of electronic device 110-1. Then, radio 114-2 may transmit a TWT setup response in a packet or frame to electronic device 110-1. This TWT setup response may include information that specifies the TWT SP schedule, including: a TWT SP start time, a TWT SP duration, and/or an interval between TWT SPs.

As described further below with reference to FIG. 7, the TWT SP schedule may be modified based, at least in part, on the non-availability information. For example, the modification may include: a change to the TWT SP start time, a change to the TWT SP duration, or both. Moreover, as described further below with reference to FIG. 8, when a time when electronic device 110-1 will be unavailable occurs during a TWT SP in the TWT SP schedule, a longest time interval in the TWT SP when electronic device 110-1 is available may be indicated in the TWT SP schedule. Furthermore, as described further below with reference to FIG. 9, when a TWT SP has a TWT SP duration that is less than a minimum value, the TWT SP may be excluded from the TWT SP schedule. In some embodiments, the TWT SP schedule may specify broadcast TWT SPs and, based at least in part on the non-availability information, may transition electronic device 110-1 from membership in a first TWT flow to a second TWT flow in which the broadcast TWT SPs are compatible with the non-availability information.

Note that at least one of the TWT setup request or the TWT setup response may include an OMI parameter. Moreover, the OMI parameter may include information specifying at least one of: a change in a number of spatial streams used during the TWT SPs in the TWT SP schedule, or a change in a bandwidth used during communication with electronic device 110-1 in the TWT SPs in the TWT SP schedule.

In these ways, the communication technique may allow electronic devices 110 and access point 112 to communicate efficiently (such as with low latency) using wake-up radios 118, while significantly reducing the power consumption associated with radios 114 and wake-up radios 118 in electronic devices 110. These capabilities may improve the user experience when using electronic devices 110.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA). For example, radio 114-2 may provide a trigger frame for the subset of recipient electronic devices. This trigger frame may be provided after a time delay (such as a time delay between, e.g., 10 and 300 ms), so that radio 114-1 has sufficient time to transition to the higher-power mode. Moreover, after radio 118-1 receives a wake-up frame or when there is a TWT SP and radio 114-1 transitions to the higher-power mode, radio 114-1 may provide a group acknowledgment to radio 114-2. For example, radio 114-1 may provide the acknowledgment during an assigned time slot and/or in an assigned channel in the group acknowledgment. However, in some embodiments the one or more recipient electronic devices may individually provide acknowledgments to radio 114-2. Thus, after radio 118-1 receives the wake-up frame and radio 114-1 transitions to the higher-power mode, radio 114-1 (and, more generally, the main radios in the one or more recipient electronic devices) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
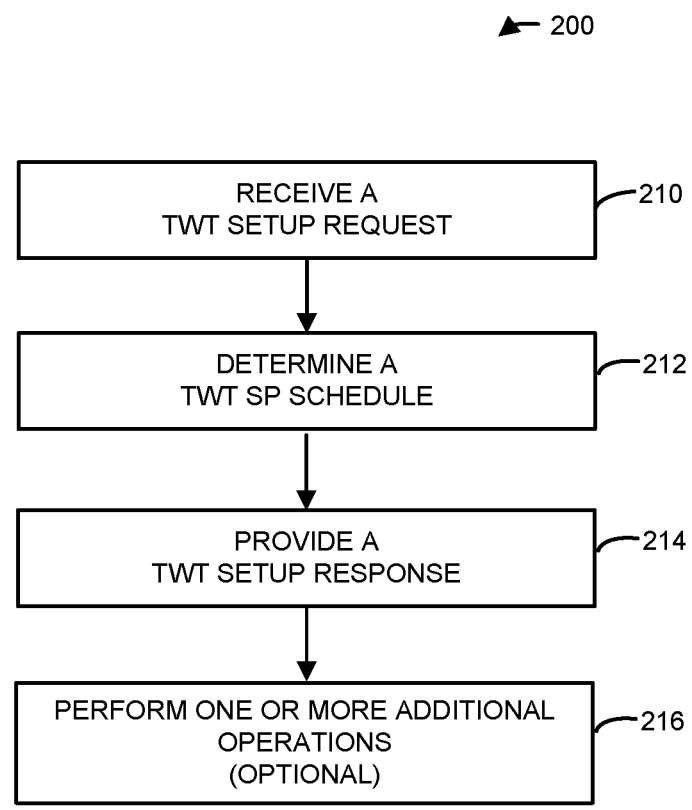
FIG. 2 is a flow diagram illustrating an example of a method for determining a targeted wake-up time (TWT) service period (SP) schedule for a recipient electronic device using one of the electronic devices in FIG. 1.

FIG. 2 presents a flow diagram illustrating an example method 200 for determining a TWT SP schedule for a recipient electronic device. This method may be performed by an electronic device, such as an interface circuit in access point 112 in FIG. 1. During operation, the interface circuit may receive a TWT setup request (operation 210) associated with the recipient electronic device, where the TWT setup request includes non-availability information specifying one or more times when the recipient electronic device will be unavailable. The TWT setup request may specify a TWT flow for power saving at the recipient electronic device. Moreover, the TWT setup request may not suspend TWT SPs of the recipient electronic device. Note that the recipient electronic device being unavailable may include the recipient electronic device having limited ability to transmit, receive or both.

Then, the electronic device may determine the TWT SP schedule (operation 212) for the recipient electronic device based, at least in part, on the non-availability information. For example, the TWT SP schedule may be determined by the interface circuit, program instructions executed on the recipient electronic device, or both.

In embodiments where the TWT SP schedule already exists, the TWT SP schedule may be modified based, at least in part, on the non-availability information. For example, the modification may include: a change to the TWT SP start time, a change to the TWT SP duration or both. Furthermore, when a time when the recipient electronic device will be unavailable occurs during a TWT SP in the TWT SP schedule, a longest time interval in the TWT SP when the recipient electronic device is available may be indicated in the TWT SP schedule. Additionally, when a TWT SP has a TWT SP duration that is less than a minimum value, the TWT SP may be excluded from the TWT SP schedule.

Next, the interface circuit may provide a TWT setup response (operation 214) intended for the recipient electronic device, wherein the TWT setup response includes information specifying the TWT SP schedule for the recipient electronic device that includes at least one of: a TWT SP start time, a TWT SP duration, or an interval between TWT SPs.

Note that at least one of the TWT setup request or the TWT setup response may include an OMI parameter. Moreover, the OMI parameter may include information specifying at least one of: a change in a number of spatial streams used during the TWT SPs in the TWT SP schedule, or a change in a bandwidth used during communication with the recipient electronic device in the TWT SPs in the TWT SP schedule.

In some embodiments, the TWT setup request, the TWT setup response, or both may be compatible with an IEEE 802.11 communication protocol.

In some embodiments, the interface circuit optionally performs one or more additional operations (operation 216). For example, the integrated circuit may receive a second TWT setup request associated with the recipient electronic device. The second TWT setup request may indicate a request for a TWT flow for power saving at the recipient electronic device. Furthermore, the TWT SP schedule may specify broadcast TWT SPs (for one or more recipient electronic devices) and, based at least in part on the non-availability information, may transition the recipient electronic device from membership in a first TWT flow to a second TWT flow in which the broadcast TWT SPs are compatible with the non-availability information.

Figure 3:
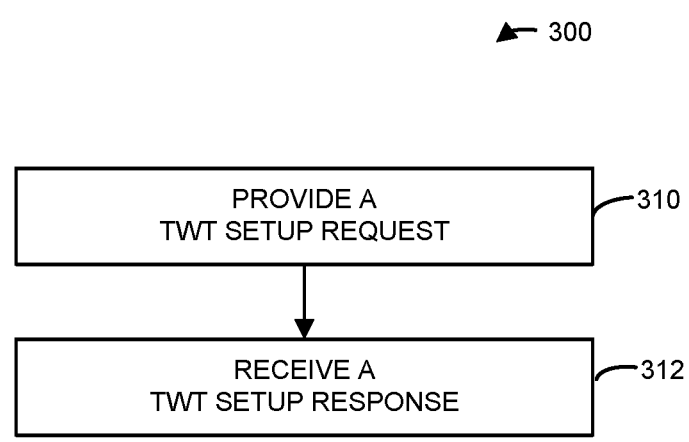
FIG. 3 is a flow diagram illustrating an example of a method for receiving a TWT setup response using one of the electronic devices in FIG. 1.

FIG. 3 presents a flow diagram illustrating an example method 300 for receiving a TWT setup response. This method may be performed by a recipient electronic device, such as an interface circuit in electronic device 110-1 in FIG. 1. This interface circuit may include a wake-up radio and a main radio. During operation, the main radio may provide a TWT setup request (operation 310) intended for the electronic device, where the TWT setup request includes non-availability information specifying times when the recipient electronic device will be unavailable. Then, the main radio may receive the TWT setup response (operation 312) associated with the electronic device, where the TWT setup response includes information specifying a TWT SP schedule for the recipient electronic device that includes one or more of: a TWT SP start time, a TWT SP duration, or an interval between TWT SPs.

In some embodiments of methods 200 (FIG. 2) and/or 300, there may be additional or fewer operations. Moreover, the order of the operations may be changed, and/or two or more operations may be combined into a single operation or performed at least partially in parallel.

In some embodiments, at least some of the operations in methods 200 (FIG. 2) and/or 300 are performed by an interface circuit in the electronic device. For example, at least some of the operations may be performed by firmware executed by an interface circuit, such as firmware associated with a MAC layer, as well as one or more circuits in a physical layer in the interface circuit.

Figure 4:
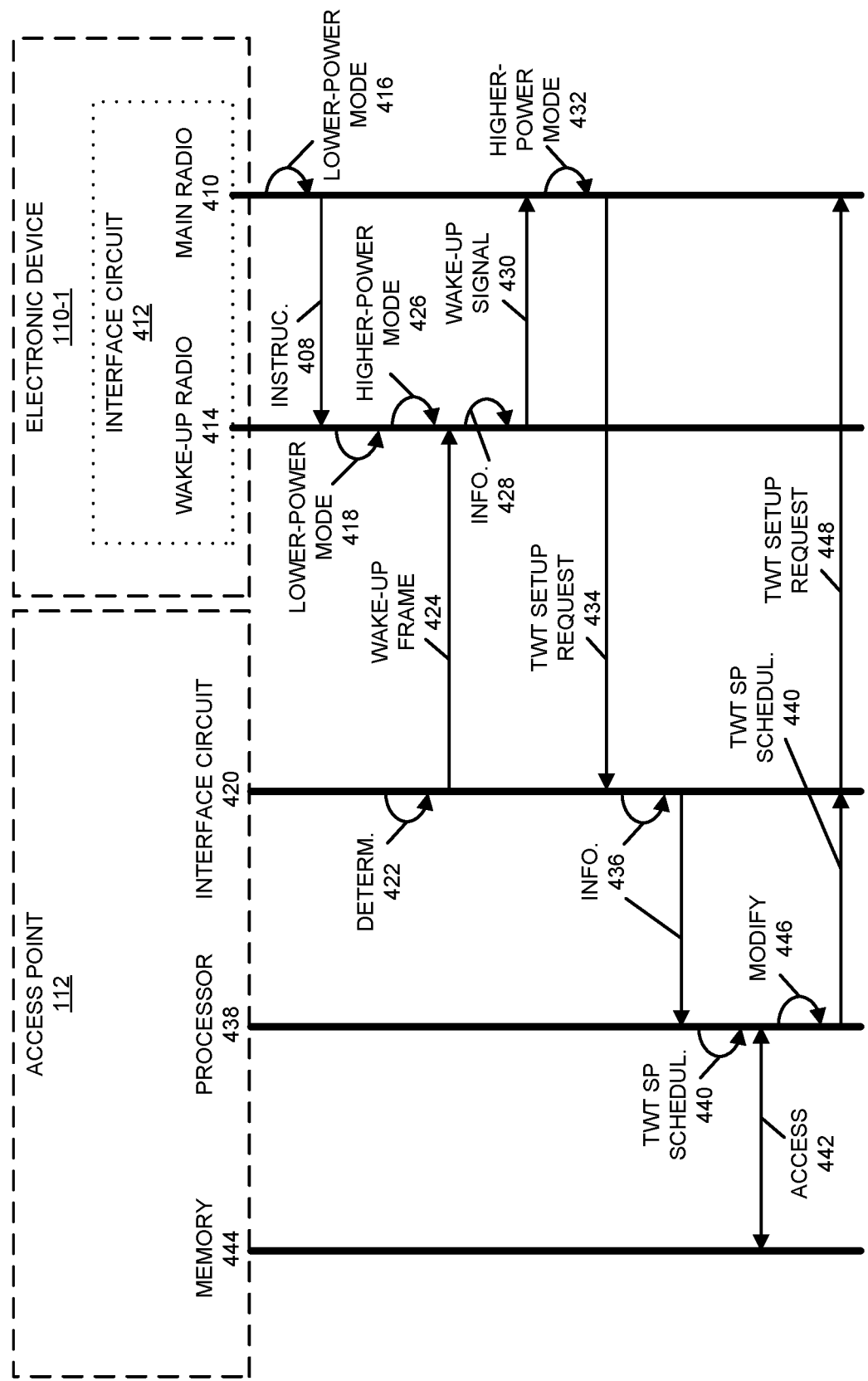
FIG. 4 is a flow diagram illustrating an example of communication between electronic devices, such as the electronic devices of FIG. 1.

The communication technique is further illustrated in FIG. 4, which presents a flow diagram illustrating an example of communication between electronic device 110-1 and access point 112. After associating with access point 112, main radio 410 in interface circuit 412 in electronic device 110-1 may transition to a lower-power mode 416. Moreover, main radio 410 may instruct 408 wake-up radio 414 in interface circuit 412 to transition to a lower-power mode 418. Next, interface circuit 420 may determine 422 to provide wake-up frame 424 for a wake-up radio 414 (such as wake-up radio 118-1) in interface circuit 412. For example, interface circuit 420 may determine 422 to provide wake-up frame 424 when there is downlink traffic (such as data associated with a service) for electronic device 110-1 and during a TWT SP of electronic device 110-1.

When the TWT SP occurs, wake-up radio 414 may transition to a higher-power mode 426 and may receive wake-up frame 424. After receiving wake-up frame 424, wake-up radio 414 may extract and analyze information 428. Then, wake-up radio 414 may perform a remedial action. For example, wake-up radio 414 may provide, to main radio 410, a wake-up signal 430 that transitions main radio 410 from low-power mode 416 to a higher-power mode 432 based at least in part on information 428.

In some embodiments, main radio 410 may optionally provide TWT setup request 434 with information 436 that specifies availability (or non-availability) of electronic device 110-1 to access point 112. In response, interface circuit 420 may optionally provide information 436 to processor 438. Processor 438 may optionally determine a TWT SP schedule 440 for electronic device 110-1 based at least in part on the non-availability of electronic device 110-1. Alternatively or additionally, processor 438 may optionally access 442 an existing TWT SP schedule, which is stored in memory 444, and which is subsequently modified 446 based at least in part on information 436 to determine TWT SP schedule 440. Then, processor 438 may optionally provide TWT SP schedule 440 to interface circuit 420, which may optionally provide TWT setup response 448 with information that specifies TWT SP schedule 440 to main radio 410.

While communication between the components in FIG. 4 is illustrated with unilateral or bilateral communication (e.g., lines having a single arrow or dual arrows), in general a given communication operation may be unilateral or bilateral.

In some embodiments of the wake-up radio technology, the communication technique is used to determine, modify, and/or exchange a TWT SP schedule. While a TWT SP schedule can provide power savings (e.g., by allowing a wake-up radio to transition to a lower-power mode outside of the TWT SPs), if a recipient electronic device will be unavailable during a TWT SP, packets or frames sent from an access point (and, more generally, a transmitting electronic device) may be missed, which may increase the latency and/or the power consumption of the recipient electronic device.

In order to address this challenge, a TWT SP schedule for a recipient electronic device may be determined at least in part on the availability (or non-availability) of the recipient electronic device. Using the TWT SPs in a TWT SP schedule, a wake-up radio may selectively transition from a lower-power mode to a higher-power mode. Once in the higher-power mode, the wake-up radio may receive a wake-up frame. Moreover, based at least in part on the information included in the wake-up frame, the wake-up radio may selectively transition a main radio (or other radio) in the recipient electronic device from a lower-power mode to a higher-power mode.

Figure 5:
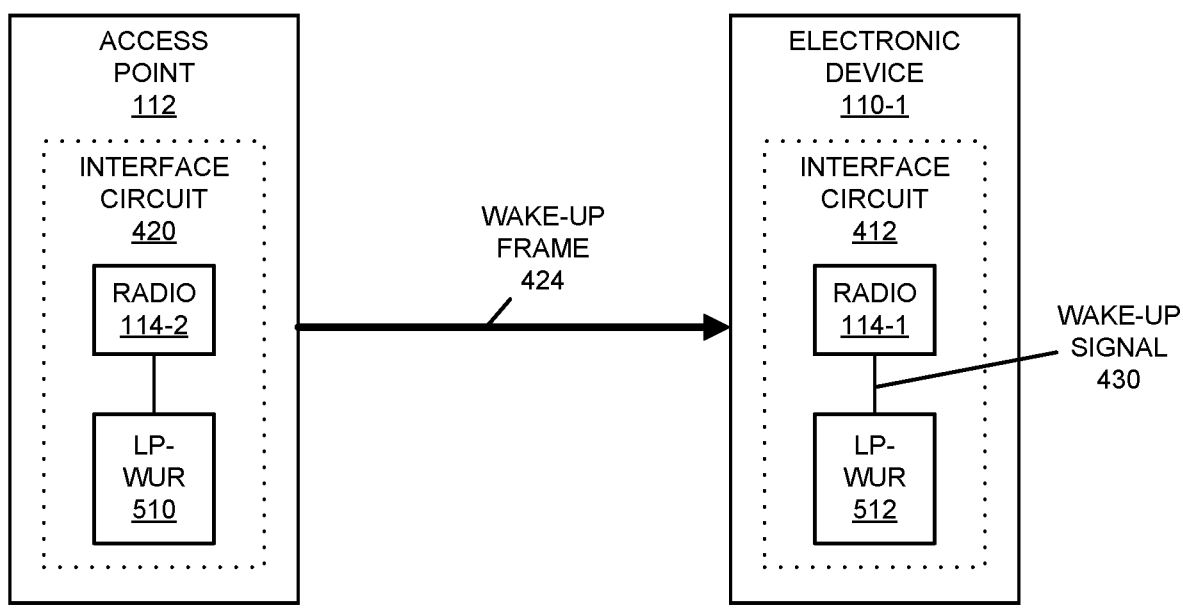
FIG. 5 is a drawing illustrating an example interface circuit in one of the electronic devices in FIG. 1.

As shown in FIG. 5, which presents a drawing illustrating an example of an interface circuit 412 in electronic device 110-1, a wake-up radio (LP-WUR) 512 (such as wake-up radio 414) may be a companion radio to a main (WI-FI) radio 114-1 in interface circuit 412. Wake-up radio 512 may allow electronic device 110-1 to turn off main radio 114-1, e.g., whenever possible. Moreover, wake-up radio 512 may wake up main radio 114-1 when wake-up frame 424 (such as a wake-up-radio packet), sent from optional wake-up radio (LP-WUR) 510 or radio 114-2 in access point 112, specifies electronic device 110-1. Note that in some embodiments wake-up radio 512 is configured to receive wireless signals, while main radio 114-1 is configured to transmit and to receive wireless signals. In these ways, the power consumption of wake-up radio 512 may be very low, e.g., lower than BLUETOOTH Low Energy. In some other embodiments, wake-up radio 512 may be configured to transmit and receive wireless signals, while still achieving a power savings. Wake-up radio 512 can operate in an always-on mode and/or in a duty-cycle mode. For example, in the duty-cycle mode, wake-up radio 512 may turn on or listen for a wake-up frame from access point 112 based at least in part on a TWT SP schedule of electronic device 110-1.

In some embodiments, a recipient electronic device (which is sometimes referred to as a 'station' or STA) that is other than an access point may signal or provide the repeating times when it is not (or will not be) able to, or will have limited capability to, receive and/or transmit. This signaling may enable an electronic device (such as an access point) to enhance TWT SP timing, adjust the TWT SP durations, and/or use a bandwidth, channel width, and/or a number of spatial streams (NSS) that the recipient electronic device is able to receive. Moreover, the recipient electronic device may only need to revise the unavailability times if there is a change (e.g., differentially). Note that the communication technique may reduce transmission overheads, reduce power consumption by the recipient electronic device, and/or improve the transmission reliability.

As discussed previously, it can be challenging for a recipient electronic device to be available during a particular TWT SP. For example, in some embodiments, a recipient electronic device: may not be available or may have limited transmission/reception capability during a TWT SP; may be scanning in other channels to find the most-suitable electronic device for association; may be determining range (or distance) to one or more other electronic devices; may be exchanging data in a device-to-device network; may have multiple radios and that cannot operate simultaneously with one or more WI-FI radios; and/or may have another type of conflict.

A variety of techniques may be used to avoid operation when a recipient electronic device is not available. For example, the electronic device may select the TWT SPs in the TWT SP schedule at times when the recipient electronic device is available. Alternatively or additionally, the recipient electronic device may use suspend and resume TWT signaling to avoid operation when the recipient electronic device is not available and/or may use announced TWT and control when the TWT SP is initiated. In some embodiments, the recipient electronic device uses operating mode signaling to set the channel width and/or NSS. These techniques are described further below.

In some embodiments, the TWT SPs in the TWT SP schedule may have a start time, a TWT SP duration, and an interval (or equivalents thereof). These parameters may be set or selected by the electronic device to have one or more specific values, so the recipient electronic device is available at TWT SPs. However, the electronic device may be congested at one or more TWT SPs. Moreover, the TWT SP times may not fit the packet-generation interval of the transmitting application. For example, the application or the recipient electronic device may wake up too infrequently, which can increase transmission delays and may lower application quality. Furthermore, waking up too frequently may increase the power consumption of the recipient electronic device. Consequently, in many existing communication techniques a recipient electronic device typically cannot indicate the unsuitable operating times to the electronic device.

As noted previously, in some embodiments signaling may be used to suspend and resume TWT. Notably, if a recipient electronic device knows that it will not be available for one or more upcoming TWT SPs (such as, e.g., the next five TWT SPs), the recipient electronic device may use suspend and resume signaling to temporarily suspend the TWT SPs. The suspend duration may encompass multiple TWT SPs. Note that during the suspended TWT SPs, the recipient electronic device may not receive transmissions from the electronic device.

Alternatively or additionally, in some embodiments operating mode signaling may be used. Notably, a recipient electronic device may send an OMI to the electronic device (e.g., in a MAC header of a data frame) to set its capability to operate without uplink multi-user (UL MU) frames, with a partial channel width and/or with reduced NSS. For example, in at least some embodiments, the channel width or bandwidth may be, e.g., 20, 40, 80, or 160 MHz. This operating mode may be in use until the next OMI signaling is received from the recipient electronic device. However, in a highly congested environment, timely OMI information transmission may be difficult. Typically, a receiving electronic device may need time to adjust to a new (larger/smaller) channel width and/or NSS in its transmission scheduling. This adjustment time may prevent the recipient electronic device from operating during a remainder of the TWT SPs.

Moreover, the recipient electronic device may use announced non-triggered TWT. Notably, a recipient electronic device may setup a non-triggered announced TWT in order to control the initiation of the TWT SPs. Buffered downlink (DL) frames may be transmitted after the recipient electronic device has sent a data frame, a null frame or a power save_poll (PS_Poll) frame to the electronic device. However, the electronic device usually needs to be available for the whole TWT SP duration. Sometimes the electronic device may wait to receive a frame to start DL transmissions. Thus, in some embodiments, the electronic device may not allow the use of non-triggered announced TWT. Note that triggered TWT may be used when the electronic device operates in a high-density environment.

Furthermore, the recipient electronic device may use triggered TWT. The trigger frame may be transmitted as soon as possible after the start time of the TWT SP. However, if a recipient electronic device does not receive the trigger frame, it cannot be available at the TWT SP start time. Consequently, the recipient electronic device may miss the whole TWT SP or, at the very least, initiation of the TWT SP may be delayed.

Additionally, the electronic device may terminate the TWT SP. Notably, an ongoing TWT SP may continue until the TWT SP end time or until the electronic device transmits a frame with an end of service period (EOSP) field set to '1' or a more data field set to '0,' which may terminate the TWT SP early. However, as noted previously, a recipient electronic device typically has no ability to terminate the TWT SP. Thus, if it cannot be available until the end of the TWT SP duration, a recipient electronic device may need to miss the whole announced TWT SP. Skipping a whole TWT SP may increase transmission delays and may increase frame loss. In addition, a recipient electronic device during an unannounced TWT (in which the electronic device can send data to the recipient electronic device when a TWT SP starts) may suffer from severe frame loss when the recipient electronic device is not available for the duration of the TWT SP.

Note that the TWT SPs usually need to be long enough to have time for any/all of: channel accesses and tolerance for busy channel and transmissions from other recipient electronic devices, UL and DL data transmissions, and/or data retransmission. The electronic device may terminate a TWT SP early if there is no more UL or DL data to transmit. Such early TWT SP termination may reduce or minimize the TWT SP overheads. However, if a TWT SP is too short, the buffered data may not fit into a single TWT SP and one or more following TWT SPs may have more data to transmit. This may increase the transmission delay and/or may force the recipient electronic device to operate in active or higher-power mode, which may increase the power consumption.

In some embodiments, one or more of the TWT SP durations may be overallocated. In general, long TWT SP durations may increase co-existence problems. Moreover, if a recipient electronic device cannot be available during the whole TWT SP duration, increasing the TWT SP duration may degrade the performance of the recipient electronic device. If the electronic device does not know the availability of the recipient electronic device, this may seem illogical. However, a longer TWT SP duration may only improve system reliability and performance if the recipient electronic device is available during the whole TWT SP duration.

Figure 6:
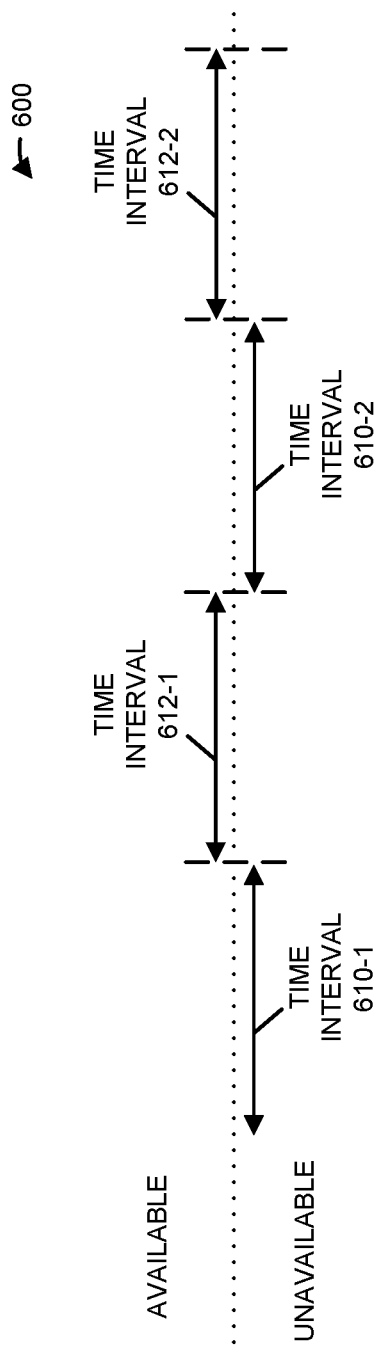
FIG. 6 is a drawing illustrating an example signaling schedule.

In order to address these challenges, in the described communication technique a recipient electronic device may signal to the electronic device a schedule indicating when the recipient electronic device is not able to transmit or receive. For example, as shown in FIG. 6, which presents a drawing illustrating an example signaling schedule 600, a recipient electronic device may list the repeating times 610 when it is not able to transmit or receive and/or the repeating times 612 when it is able to transmit or receive. In some embodiments, the recipient electronic device may indicate times using TWT signaling (such as in a TWT setup request). The electronic device may use this information to select or determine the TWT SP times, such as at the times when the recipient electronic device is able to transmit and receive. Note that TWT SPs in the TWT SP schedule may be announced or unannounced.

Figure 7:
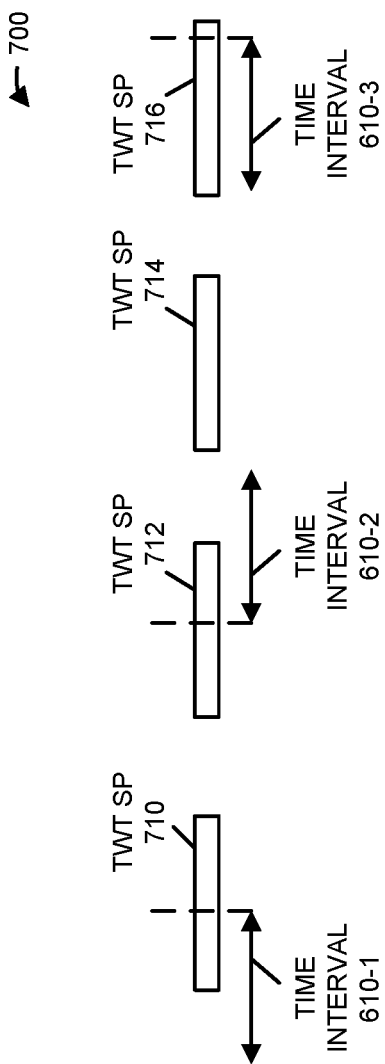
FIGS. 7-9 are drawings illustrating example TWT SP schedules.

Moreover, as shown in FIG. 7, which presents a drawing illustrating an example TWT SP schedule 700, in the communication technique the electronic device may adjust the TWT SP start time and/or the TWT SP duration. For example, a recipient electronic device may have repeating times 610 when it is not able to transmit or receive. The TWT SP duration may be adjusted to avoid these times. Notably, a TWT SP may be started when the recipient electronic device is able to transmit and receive. Alternatively, the start of the TWT SP may be changed to announced TWT to allow the recipient electronic device to control when the TWT SP is started. In some embodiments, the TWT SP duration is shortened to avoid operation when the recipient electronic device is not able to transmit or receive. Thus, as shown in FIG. 7, TWT SP 710 may be started late, TWT SPs 712 and 716 may be stopped early, and TWT SP 714 may be unchanged.

Figure 8:
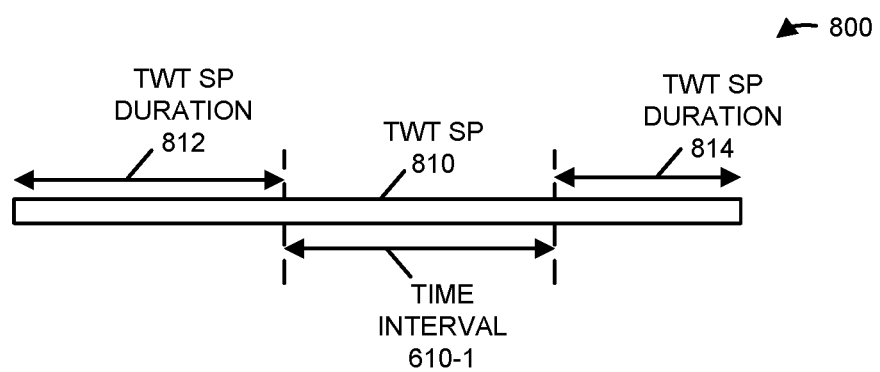

Furthermore, as shown in FIG. 8, which presents a drawing illustrating an example TWT SP schedule 800, the electronic device may select a longest TWT SP duration 812 when determining the TWT SP schedule. Notably, if a time 610-1 when recipient electronic device cannot operate is during TWT SP 810, then the longest available TWT SP duration 812 may be selected. Moreover, if the non-available time 610-1 splits TWT SP 810 into equal durations, then the first part of the TWT SP may be used for data transmission. Note that the unselected/shorter TWT SP duration(s) (such as unused TWT SP duration 814) may not be used for data transmission. For example, a recipient electronic device may sleep or may enter a power-saving mode during the unused TWT SP duration 814.

Figure 9:
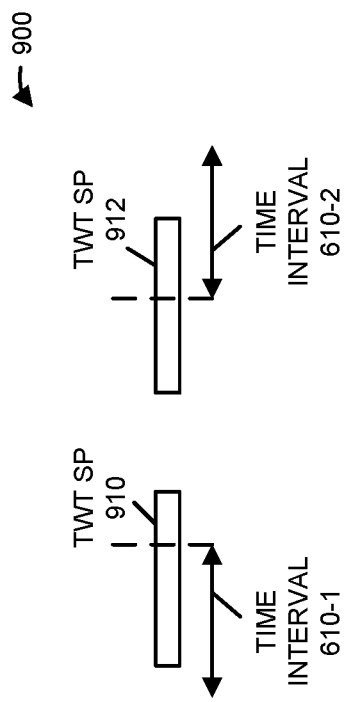

Additionally, as shown in FIG. 9, which presents a drawing illustrating an example TWT SP schedule 900, when determining the TWT SP schedule the electronic device may skip TWT SPs that are too short (such as TWT SP 910), while keeping the remaining TWT SPs (such as TWT SP 912). Notably, the TWT signaling may define a TWT SP minimum duration. When, after reducing the unavailable times, the TWT SP duration is shorter than the minimum TWT SP duration, a recipient electronic device may not wake up for the TWT SP. In general, the TWT SP minimum duration may depend on the application. For example, for VoIP, the TWT SP minimum duration may be 2-3 ms, less than 5 ms, etc. In other embodiments, the TWT SP minimum duration can be, e.g., more than 5 ms, 10-15 ms, 15-20 ms, etc. Note that avoiding TWT SPs that are very short may reduce the power consumption of the recipient electronic device and/or may allow sufficient transmission time for efficient data transmissions.

In some embodiments, the communication technique is used to adjust a TWT SP schedule for broadcast TWT. During broadcast TWT operation, the broadcast TWT SP may be used by one or more recipient electronic devices. In these embodiments, if the electronic device maintains the broadcast TWT SP start time and TWT SP duration, the electronic device may transmit to a recipient electronic device that has limited availability only during the modified TWT SP duration. Moreover, if the modified TWT SP duration is shorter than the TWT SP minimum duration, then the electronic device may not transmit to the recipient electronic device during this broadcast TWT SP.

Furthermore, when a recipient electronic device has broadcast TWT SPs ongoing at the times when the recipient electronic device is not able to operate, the electronic device may change the recipient electronic device membership to a broadcast TWT flow that has broadcast TWT SPs at times when the recipient electronic device is available.

Additionally, if the electronic device receives non-availability information from multiple recipient electronic devices indicating that they may not be available at the same times, the electronic device may avoid scheduling any broadcast TWT SPs during these times.

Note that, if multiple recipient electronic devices in a broadcast TWT SP are limited to transmit or receive with a small bandwidth, the electronic device may organize UL multi-user random-access opportunities in the bandwidth(s) that are not used by the recipient electronic devices using the TWT SPs.

In some embodiments, if multiple recipient electronic devices using broadcast TWT SPs are limited to transmit or receive with only one or few (such as, e.g., 1-4) spatial streams at specific times, the electronic device may organize a broadcast TWT SP that has a short TWT SP duration for these times. For example, the short duration broadcast TWT SP may be used to transmit high priority real-time VoIP and gaming data. Alternatively or additionally, the short duration broadcast TWT SP may be used to collect short messages, such as transmission buffer status information from the associated recipient electronic devices.

Moreover, the recipient electronic device may propose a scheduled channel width and/or an NSS setting. For example, TWT setup request and TWT setup response frames (from the recipient electronic device and the electronic device, respectively) in the TWT signaling may include OMI parameters to specify a maximum channel width and/or an NSS for a schedule period. This capability may allow the recipient electronic device to modify the OMI parameters based at least in part on resource limitations. When a recipient electronic device uses a larger channel width and/or a larger NSS than currently specified for the TWT, then the channel width and/or the NSS may be set to values currently specified by the TWT for the duration of the scheduled period. However, if the recipient electronic device uses smaller or equal channel width and/or NSS than those currently specified for the TWT, the values may not be changed. After the TWT SP, note that the channel width and/or the NSS may be returned to the values used before the TWT SP.

During a TWT flow setup in the communication technique, a TWT setup frame may be used to setup a single TWT, such as a TWT flow for power saving or a TWT flow that avoids operation at times when a recipient electronic device is not available. Notably, the recipient electronic device may transmit one or two TWT setup request frames. A first TWT setup frame may request a TWT flow for power saving (as opposed to an active mode where the recipient electronic device is always available), and a second TWT setup frame may request a TWT flow to avoid times when the recipient electronic device is not available. Note that the two TWT setup frames may be communicated separately. Alternatively, two setup MAC protocol data units (MPDUs) or MAC management protocol data units (MMPDUs) may be aggregated into to the same physical layer convergence procedure (PLCP) protocol data unit (PPDU) and may be transmitted at the same time.

In response to receiving the TWT setup requests from the recipient electronic device, the electronic device may accept either or both requested TWT flows. In this example, the TWT flow for power saving may be ongoing and may be limited with times specified by the schedule when the electronic device is not available. Alternatively, the electronic device may only accept the TWT flow for power saving. In these embodiments, the TWT flow may be ongoing without limitations. Note that the electronic device may propose alternative parameters for the TWT flow used for power saving. Additionally, note that, when the recipient electronic device is not available, the TWT flow may be used to select a suitable schedule for one or more recipient electronic devices.

Figure 10:
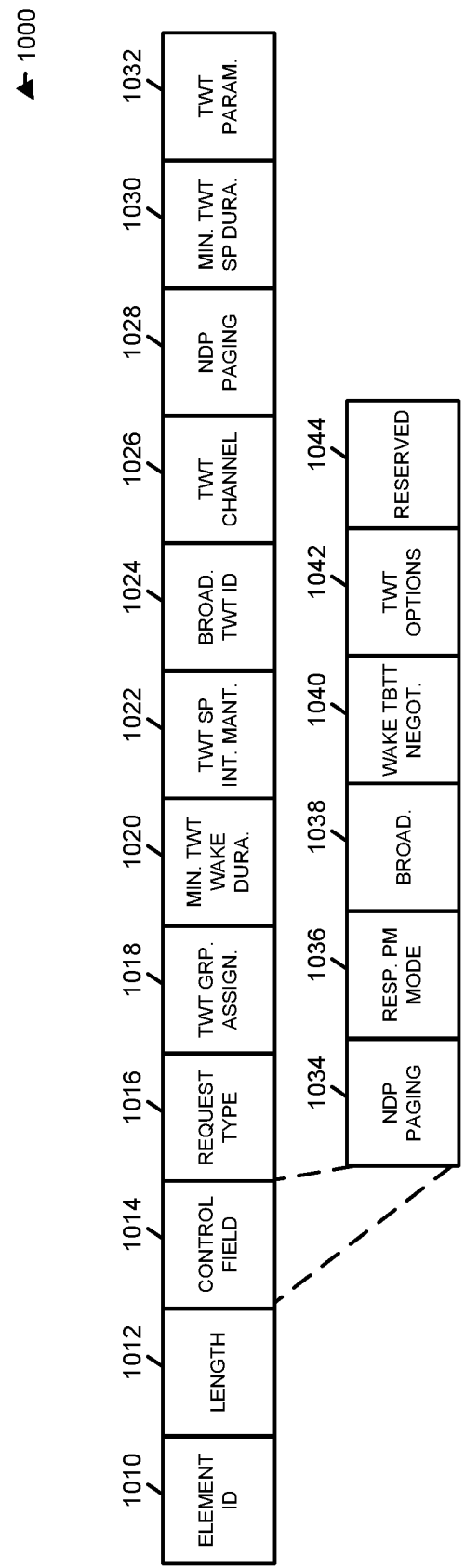
FIG. 10 is a drawing illustrating an example of a TWT element with a control field in a TWT setup request or a TWT setup response.

As shown in FIG. 10, which presents a drawing illustrating an example of a TWT element 1000 with a control field 1014 in a TWT setup request or a TWT setup response, the TWT setup signaling may indicate the times when a recipient electronic device is not available. Notably, TWT element 1000 may include: an element identifier (ID) 1010, a length 1012, control field 1014, a request type 1016, a TWT group assignment 1018, a nominal minimum TWT wake duration 1020, a TWT SP interval mantissa 1022, a broadcast TWT identifier 1024, a TWT channel 1026, optional null data packet (NDP) paging 1028, a minimum TWT SP duration 1030, and/or TWT parameters 1032. For example, element identifier 1010 may have a length of 1 octet, length 1012 may have a length of 1 octet, request type 1016 may have a length of 2 octets, TWT group assignment 1018 may have a length of 0 or 8 octets, nominal minimum TWT wake duration 1020 may have a length of 0, 3 or 9 octets, TWT SP interval mantissa 1022 may have a length of 2 octets, broadcast TWT identifier 1024 may have a length of 0 or 1 octets, TWT channel 1026 may have a length of 1 octet, optional null-data-packet (NDP) paging 1028 may have a length of 0 or 4 octets, minimum TWT SP duration 1030 may have a length of 0 or 1 octets, and/or TWT parameters 1032 may have a length of 0 or 1 octet.

Moreover, control field 1014 may include: null data packet paging 1034, responder PM mode 1036, broadcast 1038, wake target beacon transmission time (TBTT) negotiation 1040, TWT options 1042 and/or reserved 1044. For example, null-data-packet paging 1034 may have a length of 1 bit, responder PM mode 1036 may have a length of 1 bit, broadcast 1038 may have a length of 1 bit, wake target beacon transmission time negotiation 1040 may have a length of 1 bit, TWT options 1042 may have a length of 1 bit and/or reserved 1044 may have a length of 3 bits. Note that options field 1042 of control field 1014 of the TWT setup request and/or the TWT setup response frames may have a length of set, e.g., to '1' to indicate that one or more TWT parameters are provided in a proposed TWT parameter set. Alternatively or additionally, the TWT parameter set may signal or indicate times when a recipient electronic device is not available for operation.

Furthermore, as shown in Table 1, which presents examples of TWT parameters, the minimum TWT SP duration field 1030 may indicate the shortest time for a TWT SP in units of, e.g., 256 microseconds. Note that a TWT SP may be skipped if its duration is shorter than the value of the minimum TWT SP duration field. Furthermore, the TWT parameters may indicate whether the TWT proposes operation limitation or a new TWT SP. Additionally, a value of, e.g., '3' in an OM control field may be included in the TWT setup request and/or the TWT setup response frames to indicate the channel width and/or the NSS. Note that the TWT parameters may be applied to an individual TWT SP schedule of a particular recipient electronic device or to a broadcast TWT SP schedule of one or more recipient electronic devices.

TABLE 1

| Value | Meaning |
| --- | --- |
| 0 | Normal TWT SP |
| 1 | Recipient electronic device is not available during the TWT SP durations |
| 2 | Recipient electronic device requests that TWT SPs are announced during the periods of the TWT SP schedule, with no change to the termination of the TWT SPs |
| 3 | Recipient electronic device has reduced channel width and/or NSS during the TWT SPs |
| 4-255 | Reserved |

In other embodiments, the order of items in TWT element 1000 and/or control field 1014 can vary and additional and/or different items can be included. While the preceding example illustrated the information that specifies the availability (or non-availability) of a recipient electronic device in one or more fields (such as in a media access control or MAC header) in a TWT setup request and/or information that specifies a TWT SP schedule in one or more fields in a TWT setup response, in some embodiments this information is included in one or more other fields in either or both of these frames or packets. In some embodiments, the MAC header is included in a data frame or a null frame.

In summary, the communication technique may allow a recipient electronic device to indicate the times when it is not able to transmit, not able to receive, has limited available channel width and/or uses NSS during the TWT SP. This communication technique may improve the reliability of transmissions because of increased understanding or situational awareness as to when a peer recipient electronic device is available. Note that TWT SP operating times can be selected to avoid times when a recipient electronic device is not available. In some embodiments, the NSS and/or channel-width transitions can be predefined, which may improve operating efficiency and/or may reduce delays.

We now describe embodiments of an electronic device. FIG. 11 presents a block diagram of an electronic device 1100 (which may be a cellular telephone, an access point, another electronic device, etc.) in accordance with some embodiments. This electronic device includes processing subsystem 1110, memory subsystem 1112, and networking subsystem 1114. Processing subsystem 1110 includes one or more devices configured to perform computational operations. For example, processing subsystem 1110 can include one or more microprocessors, application-specific integrated circuits (ASICs), microcontrollers, graphics processing units (GPUs), programmable-logic devices, and/or one or more digital signal processors (DSPs).

Memory subsystem 1112 includes one or more devices for storing data and/or instructions for processing subsystem 1110 and networking subsystem 1114. For example, memory subsystem 1112 can include dynamic random access memory (DRAM), static random access memory (SRAM), a read-only memory (ROM), flash memory, and/or other types of memory. In some embodiments, instructions for processing subsystem 1110 in memory subsystem 1112 include: program instructions or sets of instructions (such as program instructions 1122 or operating system 1124), which may be executed by processing subsystem 1110. For example, a ROM can store programs, utilities or processes to be executed in a non-volatile manner, and DRAM can provide volatile data storage, and may store instructions related to the operation of electronic device 1100. Note that the one or more computer programs may constitute a computer-program mechanism, a computer-readable storage medium or software. Moreover, instructions in the various modules in memory subsystem 1112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1110. In some embodiments, the one or more computer programs are distributed over a network-coupled computer system so that the one or more computer programs are stored and executed in a distributed manner.

In addition, memory subsystem 1112 can include mechanisms for controlling access to the memory. In some embodiments, memory subsystem 1112 includes a memory hierarchy that comprises one or more caches coupled to a memory in electronic device 1100. In some of these embodiments, one or more of the caches is located in processing subsystem 1110.

In some embodiments, memory subsystem 1112 is coupled to one or more high-capacity mass-storage devices (not shown). For example, memory subsystem 1112 can be coupled to a magnetic or optical drive, a solid-state drive, or another type of mass-storage device. In these embodiments, memory subsystem 1112 can be used by electronic device 1100 as fast-access storage for often-used data, while the mass-storage device is used to store less frequently used data.

Figure 11:
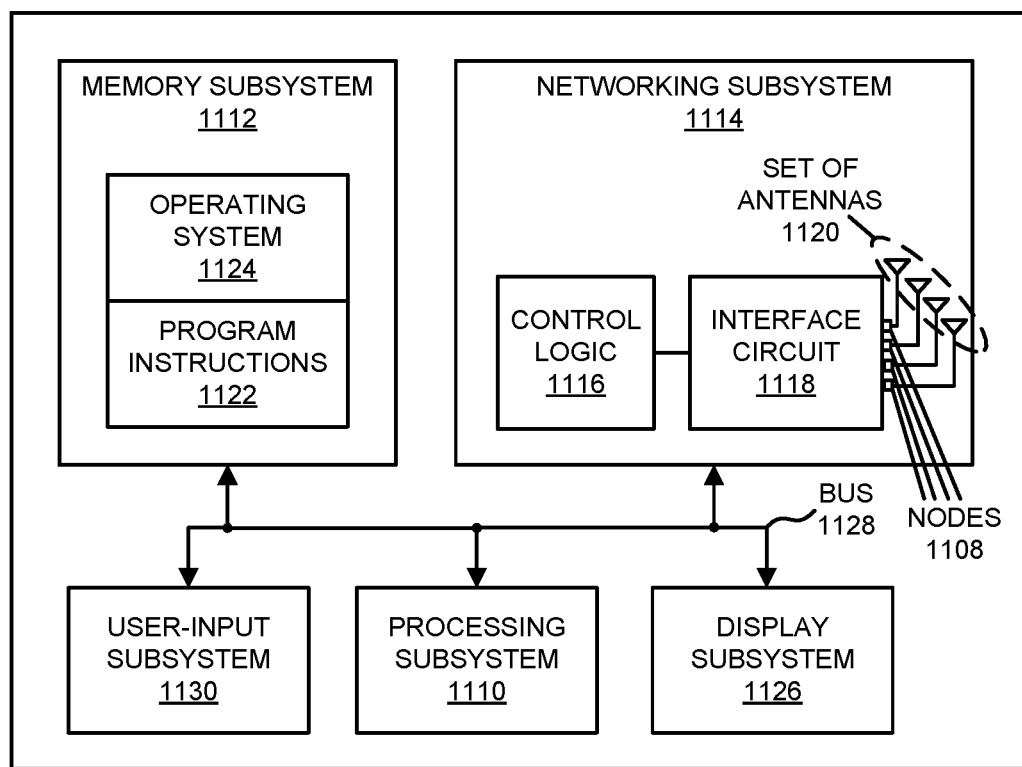
FIG. 11 is a block diagram illustrating an example of one of the electronic devices of FIG. 1.

Networking subsystem 1114 includes one or more devices configured to couple to and communicate on a wired and/or wireless network (i.e., to perform network operations), including: control logic 1116, an interface circuit 1118 and a set of antennas 1120 (or antenna elements) in an adaptive array that can be selectively turned on and/or off by control logic 1116 to create a variety of optional antenna patterns or 'beam patterns.' (While FIG. 11 includes set of antennas 1120, in some embodiments electronic device 1100 includes one or more nodes, such as nodes 1108, e.g., a pad, which can be coupled to set of antennas 1120. Thus, electronic device 1100 may or may not include set of antennas 1120.) For example, networking subsystem 1114 can include a BLUETOOTH™ networking system, a cellular networking system (e.g., a 3G/4G/5G network such as UMTS, LTE, etc.), a universal serial bus (USB) networking system, a networking system based on the standards described in IEEE 802.11 (e.g., a WI-FI networking system), an Ethernet networking system, and/or another networking system.

In some embodiments, networking subsystem 1114 includes one or more radios, such as a wake-up radio that is used to receive wake-up frames, and a main radio that is used to transmit and/or receive frames or packets during a higher-power mode. The wake-up radio and the main radio may be implemented separately (such as using discrete components or separate integrated circuits) or in a common integrated circuit.

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1100 may use the mechanisms in networking subsystem 1114 for performing simple wireless communication between the electronic devices, e.g., transmitting advertising or frame frames and/or scanning for advertising frames transmitted by other electronic devices.

Within electronic device 1100, processing subsystem 1110, memory subsystem 1112, and networking subsystem 1114 are coupled together using bus 1128 that facilitates data transfer between these components. Bus 1128 may include an electrical, optical, and/or electro-optical connection that the subsystems can use to communicate commands and data among one another. Although only one bus 1128 is shown for clarity, different embodiments can include a different number or configuration of electrical, optical, and/or electro-optical connections among the subsystems.

In some embodiments, electronic device 1100 includes a display subsystem 1126 for displaying information on a display, which may include a display driver and the display, such as a liquid-crystal display, a multi-touch touchscreen, etc. Display subsystem 1126 may be controlled by processing subsystem 1110 to display information to a user (e.g., information relating to incoming, outgoing, or an active communication session).

Electronic device 1100 can also include a user-input subsystem 1130 that allows a user of the electronic device 1100 to interact with electronic device 1100. For example, user-input subsystem 1130 can take a variety of forms, such as: a button, keypad, dial, touch screen, audio input interface, visual/image capture input interface, input in the form of sensor data, etc.

Electronic device 1100 can be (or can be included in) any electronic device with at least one network interface. For example, electronic device 1100 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1100, in alternative embodiments, different components and/or subsystems may be present in electronic device 1100. For example, electronic device 1100 may include one or more additional processing subsystems, memory subsystems, networking subsystems, and/or display subsystems. Additionally, one or more of the subsystems may not be present in electronic device 1100. Moreover, in some embodiments, electronic device 1100 may include one or more additional subsystems that are not shown in FIG. 11. Also, although separate subsystems are shown in FIG. 11, in some embodiments some or all of a given subsystem or component can be integrated into one or more of the other subsystems or component(s) in electronic device 1100. For example, in some embodiments program instructions 1122 are included in operating system 1124 and/or control logic 1116 is included in interface circuit 1118.

Moreover, the circuits and components in electronic device 1100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1114. This integrated circuit may include hardware and/or software mechanisms that are used for transmitting wireless signals from electronic device 1100 and receiving signals at electronic device 1100 from other electronic devices. Aside from the mechanisms herein described, radios are generally known in the art and hence are not described in detail. In general, networking subsystem 1114 and/or the integrated circuit can include any number of radios. Note that the radios in multiple-radio embodiments function in a similar way to the described single-radio embodiments.

In some embodiments, networking subsystem 1114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a WI-FI communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 1122, operating system 1124 (such as a driver for interface circuit 1118) or in firmware in interface circuit 1118. Alternatively or additionally, at least some of the operations in the communication technique may be implemented in a physical layer, such as hardware in interface circuit 1118. In some embodiments, the communication technique is implemented, at least in part, in a MAC layer and/or in a physical layer in interface circuit 1118.

While examples of numerical values are provided in the preceding discussion, in other embodiments different numerical values are used. Consequently, the numerical values provided are not intended to be limiting.

While the preceding embodiments illustrated the use of a TWT setup request, a TWT setup response and a wake-up frame that is communicated using WI-FI, in other embodiments of the communication technique BLUETOOTH Low Energy is used to communicate one or more of these frames or packets. Furthermore, the TWT setup request, the TWT setup response and/or the wake-up frame may be communicated in the same or a different band of frequencies that the band(s) of frequencies used by the main radio. For example, the TWT setup request, the TWT setup response and/or the wake-up frame may be communicated in one or more bands of frequencies, including: 900 MHz, 2.4 GHz, 5 GHz, 60 GHz, and/or a band of frequencies used by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a connector or a pad configured to communicatively couple to an antenna; and
   an interface circuit, communicatively coupled to the connector or the pad, configured to communicate with a recipient electronic device, wherein the electronic device comprises an access point, and the communication is compatible with an Institute of Electrical and Electronics Engineers (IEEE) 802.11 communication protocol, and wherein the interface circuit is configured to:
   receive a targeted wake-up time (TWT) setup request associated with the recipient electronic device, wherein the recipient electronic device is associated with the electronic device, and wherein the TWT setup request comprises non-availability information specifying one or more times when the recipient electronic device will be unavailable to receive or transmit;
   determine a TWT service period (SP) schedule for the recipient electronic device based, at least in part, on the non-availability information, wherein the TWT SP schedule is specific to the recipient electronic device; and
   provide a TWT setup response intended for the recipient electronic device based, at least in part, on the non-availability information, wherein the TWT setup response comprises information specifying the TWT SP schedule for the recipient electronic device that comprises at least one of: a TWT SP start time, a TWT SP duration, or an interval between TWT SPs, and
   wherein the TWT SP schedule comprises one or more times when the recipient electronic device will be unavailable and two or more TWT SPs.

2. The electronic device of claim 1, wherein the TWT SP schedule exists prior to receiving the TWT setup request and is modified based, at least in part, on the non-availability information.

3. The electronic device of claim 2, wherein the modification comprises one or more of: a change to the TWT SP start time or a change to the TWT SP duration.

4. The electronic device of claim 1, wherein, when a time when the recipient electronic device will be unavailable occurs during a TWT SP in the TWT SP schedule, a longest time interval in the TWT SP when the recipient electronic device is available is indicated in the TWT SP schedule.

5. The electronic device of claim 1, wherein, when a TWT SP has a TWT SP duration that is less than a minimum value, the TWT SP is excluded from the TWT SP schedule.

6. The electronic device of claim 1, wherein at least one of the TWT setup request or the TWT setup response comprises an operating mode indication (OMI) parameter; and
   wherein the OMI parameter comprises information specifying at least one of: a change in a number of spatial streams used during the TWT SPs in the TWT SP schedule, or a change in a bandwidth used during communication with the recipient electronic device in the TWT SPs in the TWT SP schedule.

7. The electronic device of claim 1, wherein the TWT setup request specifies a TWT flow for power saving at the recipient electronic device.

8. The electronic device of claim 1, wherein the interface circuit is configured to receive, from the connector or the pad, a second TWT setup request associated with the recipient electronic device; and
   wherein the second TWT setup request indicates a request for a TWT flow for power saving at the recipient electronic device.

9. The electronic device of claim 1, wherein the TWT setup request does not suspend TWT SPs of the recipient electronic device.

10. The electronic device of claim 1,
    wherein the IEEE 802.11 communication protocol comprises at least one of: IEEE 802.11a, IEEE 802.11b, IEEE 802.11g, IEEE 802.11-2007, IEEE 802.11n, IEEE 802.11-2012, IEEE 802.11ac, or IEEE 802.11ax.

11. The electronic device of claim 1, wherein the TWT SP schedule specifies broadcast TWT SPs and, based at least in part on the non-availability information, transitions the recipient electronic device from membership in a first TWT flow to a second TWT flow in which the broadcast TWT SPs are compatible with the non-availability information.

12. The electronic device of claim 1, wherein the recipient electronic device being unavailable comprises the recipient electronic device having limited ability to transmit, receive or both.

13. A non-transitory computer-readable storage medium for use in conjunction with an electronic device, the non-transitory computer-readable storage medium storing program instructions that, when executed by the electronic device, cause the electronic device to determine a targeted wake-up time (TWT) service period (SP) schedule for a recipient electronic device by carrying out one or more operations comprising:
receiving, via an interface circuit in the electronic device, a TWT setup request associated with the recipient electronic device, wherein the electronic device comprises an access point, and communication between the electronic device and the recipient electronic device is compatible with an Institute of Electrical and Electronics Engineers (IEEE) 802.11 communication protocol, wherein the recipient electronic device is associated with the electronic device, and wherein the TWT setup request comprises non-availability information specifying one or more times when the recipient electronic device will be unavailable;
determining the TWT SP schedule for the recipient electronic device based, at least in part, on the non-availability information, wherein the TWT SP schedule is specific to the recipient electronic device; and
providing a TWT setup response intended for the recipient electronic device, wherein the TWT setup response comprises information specifying the TWT SP schedule for the recipient electronic device that comprises one or more of: a TWT SP start time, a TWT SP duration, or an interval between TWT SPs, and
wherein the TWT SP schedule comprises one or more times when the recipient electronic device will be unavailable and two or more TWT SPs.

14. The non-transitory computer-readable storage medium of claim 13, wherein the TWT SP schedule exists prior to receiving the TWT setup request and is modified based, at least in part, on the non-availability information.

15. The non-transitory computer-readable storage medium of claim 13, wherein, when a time when the recipient electronic device will be unavailable occurs during a TWT SP in the TWT SP schedule, a longest time interval in the TWT SP when the recipient electronic device is available is indicated in the TWT SP schedule.

16. The non-transitory computer-readable storage medium of claim 13, wherein at least one of the TWT setup request or the TWT setup response comprises an operating mode indication (OMI) parameter; and
wherein the OMI parameter comprises information indicating at least one of: a change in a number of spatial streams used during the TWT SPs in the TWT SP schedule, or a change in a bandwidth used during communication with the recipient electronic device in the TWT SPs in the TWT SP schedule.

17. A method for determining a targeted wake-up time (TWT) service period (SP) schedule for a recipient electronic device, comprising:
by an electronic device, wherein the electronic device comprises an access point, and communication between the electronic device and the recipient electronic device is compatible with an Institute of Electrical and Electronics Engineers (IEEE) 802.11 communication protocol:
receiving a TWT setup request associated with the recipient electronic device, wherein the recipient electronic device is associated with the electronic device, and wherein the TWT setup request comprises non-availability information specifying one or more times when the recipient electronic device will be unavailable;
determining the TWT SP schedule for the recipient electronic device based, at least in part, on the non-availability information, wherein the TWT SP schedule is specific to the recipient electronic device; and
providing a TWT setup response intended for the recipient electronic device, wherein the TWT setup response comprises information specifying the TWT SP schedule for the recipient electronic device that comprises one or more of: a TWT SP start time, a TWT SP duration, or an interval between TWT SPs, and
wherein the TWT SP schedule comprises one or more times when the recipient electronic device will be unavailable and two or more TWT SPs.

18. The method of claim 17, wherein the TWT SP schedule is modified based, at least in part, on the non-availability information.

19. The method of claim 17, wherein, when a TWT SP has a TWT SP duration that is less than a minimum value, the TWT SP is excluded from the TWT SP schedule.

20. The method of claim 17, wherein the TWT SP schedule exists prior to receiving the TWT setup request and is modified based, at least in part, on the non-availability information.

* * * * *